United States Patent [19]

Kleinburger et al.

[11] Patent Number: 5,739,618

[45] Date of Patent: Apr. 14, 1998

[54] ELECTRIC SYNCHRONOUS MACHINE HAVING SLIP RINGS ARRANGED OUTSIDE THE MACHINE HOUSING, AND A METHOD FOR PRODUCING IT

[75] Inventors: Johann Kleinburger, Höri; Hans Zimmermann, Mönchaltorf, both of Switzerland

[73] Assignee: Asea Brown Boveri AG, Baden, Switzerland

[21] Appl. No.: 591,786

[22] Filed: Jan. 25, 1996

[30] Foreign Application Priority Data

Feb. 13, 1995 [DE] Germany ................. 195 04 655.2

[51] Int. Cl.[6] .................................................. H01R 39/08
[52] U.S. Cl. ........................... 310/232; 310/75 R; 310/96
[58] Field of Search .......................... 310/232, 75 R, 310/96

[56] References Cited

U.S. PATENT DOCUMENTS

| | | | |
|---|---|---|---|
| 4,119,873 | 10/1978 | Sakurai | 310/56 |
| 4,347,453 | 8/1982 | Gaus | 310/104 |
| 4,447,752 | 5/1984 | Boyce et al. | 310/232 |
| 4,618,793 | 10/1986 | Shizuka et al. | 310/232 |
| 5,281,880 | 1/1994 | Sakai | 310/115 |

OTHER PUBLICATIONS

Wiedermann, Eugen and Walter Kellenberger; *Konstruktion elekrischer aschinen* (1967), pp. 392–393.

*Primary Examiner*—Thomas M. Dougherty
*Assistant Examiner*—Elvin G. Enad
*Attorney, Agent, or Firm*—Oblon, Spivak, McClelland, Maier & Neustadt, P.C.

[57] ABSTRACT

In the case of thermal power installations in which a gas turbine and a steam turbine jointly drive a turbo generator, the slip rings (8, 9) are arranged on a separate slip ring shaft (14) which is connected to the actual shaft or machine shaft (10) of the electric machine by means of a first detachable coupling (11). The slip ring shaft is provided on its end averted from the electric machine with a coupling flange (15) which is not connected to the slip ring shaft (14) by welding until after the slip rings (8, 9) have been pushed on.

The use of an expensive shrink-on coupling between the turbo generator and steam turbine is avoided in this way without increasing the overall length of the turbo generator.

3 Claims, 1 Drawing Sheet

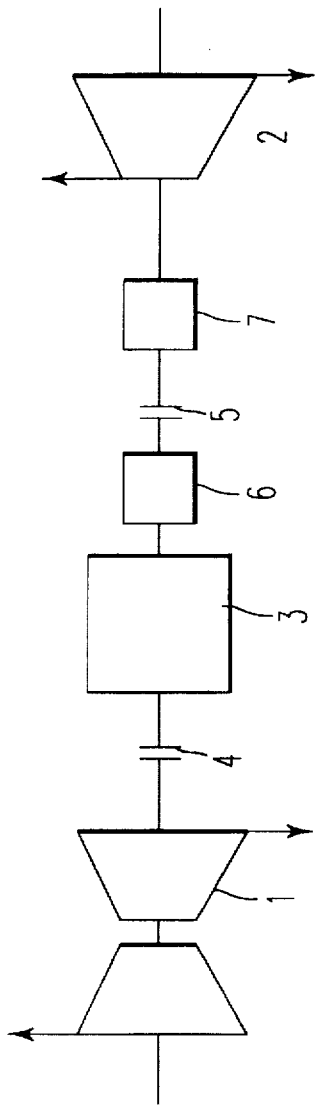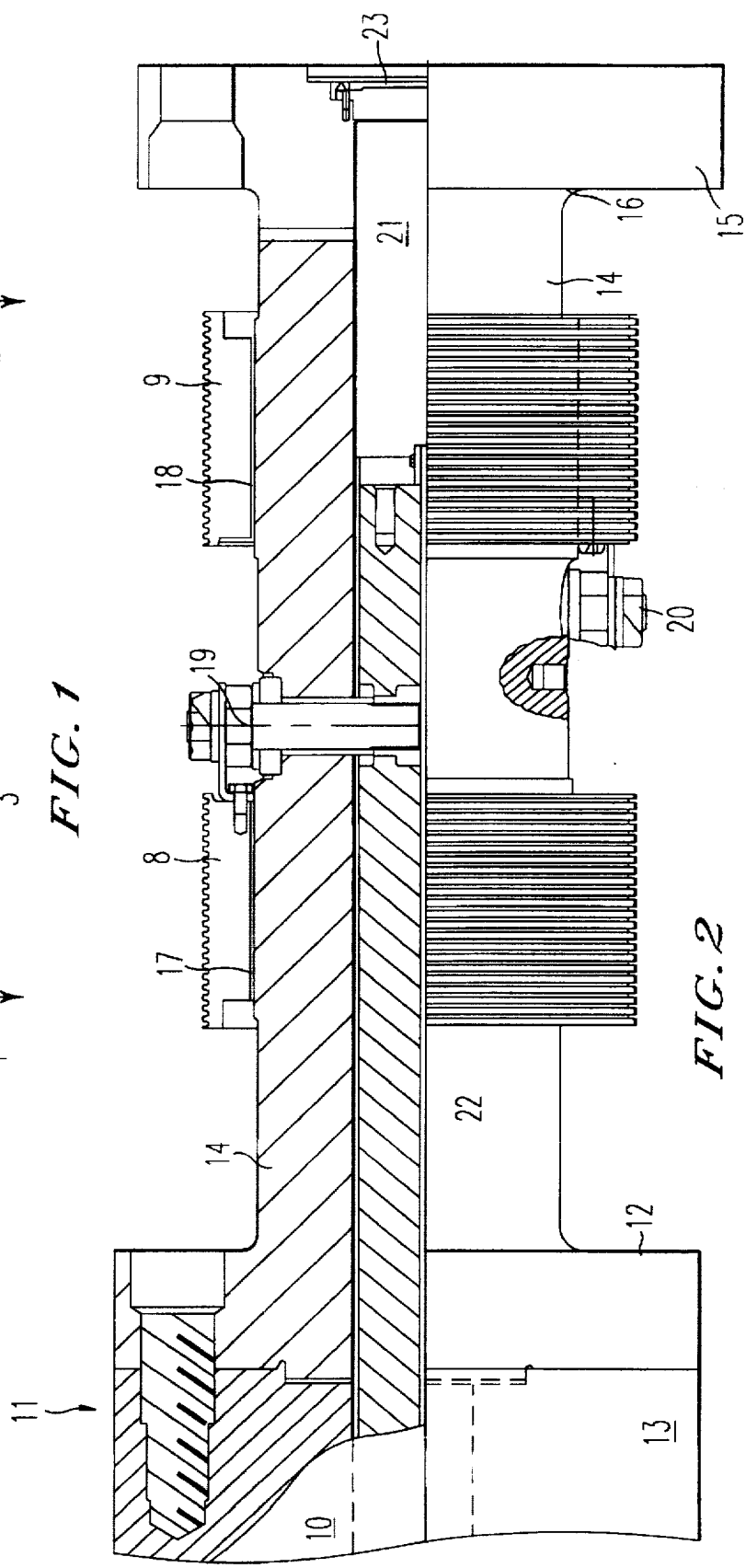

ELECTRIC SYNCHRONOUS MACHINE HAVING SLIP RINGS ARRANGED OUTSIDE THE MACHINE HOUSING, AND A METHOD FOR PRODUCING IT

BACKGROUND OF THE INVENTION

1. Field of the Invention

The invention relates to an electric synchronous machine having a slip ring arrangement arranged outside the machine housing and comprising slip rings which are mounted in an insulated fashion on a shaft.

The invention further relates to a method for producing the slip ring arrangement provided for this purpose.

2. Discussion of Background

The slip rings for synchronous machines are fed with direct current. In accordance with the two polarities, there is thus a cathodic and an anodic slip ring. It is mostly steel rings which are used. They are either shrunk in an insulated fashion onto a slip ring bushing, or are shrunk in an insulated fashion directly onto the shaft end of the machine which is not on the drive side (compare Wiedemann/Kellenberger "Konstruktion elektrischer Maschinen" ("Design of electric machines"), Springer-Verlag Berlin, Heidelberg, N.Y. 1967, FIG. 386 and FIG. 387 on page 392). This technique has proved to be best for many years, but it does presuppose that the LV shaft end is designed such that the two slip rings can be pushed on.

In the case of more recent turbine groups for so-called combination installations—in which a gas turbine is combined with a steam power plant in order to use the waste heat of the gas turbine to operate a steam turbine—the gas turbine and the steam turbine jointly drive a turbo generator (SSPT—Single-Shaft Power Train). In such single-shaft installations, the generator arranged between the gas turbine and steam turbine has couplings at both shaft ends. The coupling at the shaft end opposite the slip rings is constructed conventionally, as a rule as a flange coupling. By contrast, at the other end it is necessary to use a coupling which permits the two slip rings to be pushed over the shaft end. Use is made here of complicated shrink-on couplings with wedges, in order to be able to transmit the torque from the heat engine to the generator. The inherently obvious possibility of dimensioning the inside diameter of the slip rings such that they can be pushed over a coupling flange and then mounted on a shaft collar behind the coupling is ruled out because the enlargement of the outside diameter of the slip rings which is bound up therewith leads to excessive circumferential speeds and to impairment the rotor dynamics.

SUMMARY OF THE INVENTION

Accordingly, one object of this invention is to provide a novel electric synchronous machine having slip rings arranged outside the machine housing, in the case of which machine the overall length and, in particular, the overhang are not increased, and in which the conventional slip rings can be retained. It is, furthermore, an object of the invention to specify a method for producing such a machine.

This object is achieved according to the invention when the slip rings are arranged on a separate slip ring shaft which is connected to the actual shaft of the electric machine by means of a first detachable coupling and which is provided on its end averted from the electric machine with a coupling flange which forms one half of a second coupling and which is connected to the slip ring shaft by welding.

The production method according to the invention is one in which the two slip rings are pushed onto a slip ring shaft provided at one end with a first coupling flange, a second coupling flange is then welded oversized onto the free end of the slipring shaft, said second coupling flange is thereafter rendered free of stress by heat treatment and skimmed to design size, and subsequently two slip rings are mounted in an insulated fashion on the slip ring shaft and likewise skimmed to desired size.

The advantages of the invention are, in particular, as follows:

short overall length up to the coupling flange of the slip ring shaft;

short-circuit torques need not be transmitted by a shrink-on coupling and additional wedges;

dynamic rotor advantages result from the small dimensions, the short overall length and the slight overhang; and owing to the retention of flange couplings, both the slip ring arrangement together with the slipring shaft, or else the entire generator, can be moved out sideways if this should be necessary, for example during repairs or service work.

The invention is explained in more detail below with the aid of an exemplary embodiment represented in the drawing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a diagrammatic representation of a known thermal combination installation, which is constructed as a single-shaft installation and has a turbo generator driven by a gas turbine and by a steam turbine; and FIG. 2 shows a longitudinal section or side view of the slip ring arrangement of the turbo generator in accordance with FIG. 1.

DESCRIPTION OF THE PREFERRED EMBODIMENTS

Referring now to the drawings, wherein like reference numerals designate identical or corresponding parts throughout the several views, in FIG. 1, a gas turbine 1 and a steam turbine 2 are connected via couplings 4 and 5 to the two shaft ends of a turbo generator 3. The reference number 6 designates the slip ring arrangement arranged outside the machine housing of the turbo generator. For reasons of completeness, the overrunning clutch 7 arranged between the generator 3 and the coupling 5 on the steam turbine side is also drawn in. Such a configuration is designated as a single-shaft installation.

As was set forth in the introduction, in the case of such installations having a turbo generator driven at both ends there is the problem of being able to push the slip rings (the slip ring arrangement 6) over the coupling flange. It is here that the invention comes in. It is provided according to the invention to arrange the slip ring arrangement 6 on a separate slip ring shaft.

As emerges from FIG. 2, for this purpose the sliprings 8, 9 are arranged on a separate, hollow slip ring shaft 14 which is connected to the actual shaft or machine shaft 10 of the electric machine by means of a first detachable coupling 11 having coupling flanges 12, 13. On its end averted from the electric machine, this slip ring shaft 14 is provided with a further coupling flange 15, which is connected to the slip ring shaft by welding. The weld junction is designated in FIG. 2 by means of the reference numeral 16. Otherwise, the design of the slip ring arrangement corresponds to that of a conventional machine;

The slip rings 8, 9 are mounted (shrunk on) in an insulated fashion on the slip ring shaft 14 with the interposition of a layer 17, 18 of insulating material. Radial terminal studs 19, 20 lead from the slip rings 8 and 9 to bus bars in the shaft bore 21 of the slip ring shaft, and from there outward to the field winding of the generator, of which in FIG. 2 only the bus bar 22 assigned to the left-hand slip ring 8 is visible.

Production of the slip ring arrangement starts from a hollow shaft which is provided on its end on the generator side with a coupling flange 12 and which also already contains all the bores for receiving the terminal studs 19, 20 etc. The two slip rings 8, 9 are now pushed onto this shaft, but without being fixed on this shaft. The coupling flange 15 on the steam turbine side is then welded onto the shaft end on the steam turbine side. Use is made in this case of an oversized coupling flange. After stress-relief annealing for the purpose of eliminating the stresses introduced by the welding process, the coupling flange 15 is skimmed to desired size in order to ensure good true running. Thereafter, the slip rings are pushed to the side, and the insulation layers 17 and 18, for example polyimide film of appropriate thickness, are applied to the shaft and the slip rings 8, 9 are heated inductively and pushed onto the shaft section, provided with the insulation layers, of the slip ring shaft 14. After cooling of the slip rings 8, 9, the latter are mounted in an operationally reliable fashion on the shaft. The running surfaces of the two slip rings 8, 9 are skimmed in the next step in order to obtain optimum true running. Subsequently, the terminal studs 19, 20 are used to connect the slip rings 8, 9 electrically to the bus bars, which have meanwhile been pushed into the shaft bore 21 and planted therein, and the shaft bore 21 is sealed by means of a cover 23.

An essential presupposition for the use of the method described is that there must be enough space on the slip ring shaft 14 in the axial direction to be able to push the two slip rings 8, 9 so far to the side that the insulating layers 17, 18 can be applied. It follows the representation, largely to scale, in FIG. 2 that it suffices if there is a distance of approximately the axial slip ring width between the seat of the left-hand slip ring 8 and just such a distance between the seats of the two slip rings. The latter distance is present in any case, because after the shrinking on of the slip rings the terminal studs 19, 20 come to lie there. The distance between the coupling flange 12 and left-hand slip ring is also present, because together with its housing the brush rigging (not illustrated) assigned to the slip rings requires space in the axial direction, in any case. This means, finally, that the total axial overall length of the electric machine is not increased by the invention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An electric machine comprising a machine shaft having first and second ends which are each driven by a respective driving engine, said electric machine further having a slip ring arrangement which is arranged outside of a machine housing, said slip ring arrangement including a pair of slip rings which are mounted in an insulated fashion on a separate slip ring shaft, wherein said slip ring shaft is connected to the machine shaft of the electric machine by means of a first detachable coupling, and wherein a first coupling flange is connected to the slip ring shaft by welding at an end of said slip ring shaft opposite to that connected to said machine shaft.

2. A method for producing a slip ring arrangement for the machine as claimed in claim 1, wherein the pair of slip rings are pushed onto the slip ring shaft, with the slip ring shaft provided at one end with a second coupling flange, and said first coupling flange is then welded oversized onto a free end of the slip ring shaft, and said first coupling flange is thereafter rendered free of stress by a heat treatment and is skimmed to a design size, and subsequently the pair of slip rings are mounted in an insulated fashion on the slip ring shaft and likewise skimmed to a design size.

3. An electric machine as claimed in claim 1, wherein said first detachable coupling includes a second coupling flange, and wherein a distance between said second coupling flange and a first of said pair of slip rings is of the order of magnitude of an axial width of said first of said pair of slip rings, and further wherein an axial distance between said pair of slip rings is at least equal to a length of an axial width of a second of said pair of slip rings.

* * * * *